(12) United States Patent
Gandhi et al.

(10) Patent No.: US 10,922,584 B2
(45) Date of Patent: Feb. 16, 2021

(54) SYSTEMS, METHODS, AND TECHNIQUES FOR TRAINING NEURAL NETWORKS AND UTILIZING THE NEURAL NETWORKS TO DETECT NON-COMPLIANT CONTENT

(71) Applicant: Walmart Apollo, LLC, Bentonville, AR (US)

(72) Inventors: Shreyansh Prakash Gandhi, Milpitas, CA (US); Alessandro Magnani, Menlo Park, CA (US); Abhinandan Krishnan, Sunnyvale, CA (US); Abon Chaudhuri, Sunnyvale, CA (US); Samrat Kokkula, Santa Clara, CA (US); Venkatesh Kandaswamy, San Ramon, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 122 days.

(21) Appl. No.: 16/262,621

(22) Filed: Jan. 30, 2019

(65) Prior Publication Data
US 2020/0242407 A1    Jul. 30, 2020

(51) Int. Cl.
*G06K 9/00* (2006.01)
*G06K 9/62* (2006.01)
*G06K 9/66* (2006.01)

(52) U.S. Cl.
CPC ............. *G06K 9/6257* (2013.01); *G06K 9/66* (2013.01)

(58) Field of Classification Search
None
See application file for complete search history.

(56) References Cited

U.S. PATENT DOCUMENTS 6,269,351 B1   7/2001   Black
6,904,168 B1   6/2005   Steinberg et al.
(Continued)

FOREIGN PATENT DOCUMENTS

CN    101923652    12/2010
EP    1107130    6/2001
(Continued)

OTHER PUBLICATIONS

Indyk et al., "Approximate Nearest Neighbors: Towards Removing the Curse of Dimensionality," STOC '98: Proceedings of the 30th Annual ACM Symposium on Theory of Computing, May 1998, https://dl.acm.org/doi/proceedings/10.1145/276698, 1998.
(Continued)

*Primary Examiner* — Shervin K Nakhjavan
(74) *Attorney, Agent, or Firm* — Bryan Cave Leighton Paisner LLP

(57) ABSTRACT

Systems and methods including one or more processing modules and one or more non-transitory storage modules storing computing instructions configured to run on the one or more processing modules and perform acts of: generating a training dataset comprising synthetic training images for training a neural network detection model to identify non-compliant content in images; executing a training procedure that utilizes the synthetic training images to train the neural network detection model to identify the non-compliant content; receiving, at the neural network detection model, at least one image; and utilizing the neural network detection model to determine whether the at least one image includes the non-compliant content. Other embodiments are disclosed herein.

20 Claims, 7 Drawing Sheets

(56) References Cited

U.S. PATENT DOCUMENTS

| | | | |
|---|---|---|---|
| 7,403,928 B2 | 7/2008 | Chen | |
| 7,831,530 B2 | 11/2010 | Hashimoto | |
| 8,086,039 B2 | 12/2011 | Kletter | |
| 8,374,974 B2 | 2/2013 | Chen et al. | |
| 8,411,964 B2 | 4/2013 | Choi | |
| 8,611,617 B1 | 12/2013 | Baluja et al. | |
| 8,644,606 B2 | 2/2014 | White et al. | |
| 9,418,458 B2 | 8/2016 | Chertok et al. | |
| 9,922,272 B2 | 3/2018 | Cheng et al. | |
| 10,225,086 B2 | 3/2019 | Benchetrit et al. | |
| 10,250,538 B2 | 4/2019 | Prabhu | |
| 10,346,969 B1* | 7/2019 | Raghu | G01N 21/8803 |
| 10,426,442 B1 | 10/2019 | Schnorr | |
| 10,664,722 B1* | 5/2020 | Sharma | G06Q 30/0641 |
| 10,679,046 B1* | 6/2020 | Black | G06N 3/084 |
| 2005/0160258 A1 | 7/2005 | O'Shea et al. | |
| 2008/0134282 A1 | 6/2008 | Fridman et al. | |
| 2008/0159627 A1 | 7/2008 | Sengamedu | |
| 2011/0135204 A1 | 6/2011 | Choi | |
| 2011/0142346 A1 | 6/2011 | Han et al. | |
| 2013/0151609 A1 | 6/2013 | Rubinstein et al. | |
| 2016/0275343 A1 | 9/2016 | Dinerstein et al. | |
| 2016/0294755 A1 | 10/2016 | Prabhu | |
| 2017/0061625 A1* | 3/2017 | Estrada | G06N 3/0454 |
| 2017/0177997 A1* | 6/2017 | Karlinsky | G06K 9/6271 |
| 2017/0287137 A1* | 10/2017 | Lin | G06N 3/08 |
| 2018/0032840 A1 | 2/2018 | Yu et al. | |
| 2018/0129978 A1 | 5/2018 | Vigoda et al. | |
| 2018/0137390 A1* | 5/2018 | Brundage | G06K 9/626 |
| 2018/0152402 A1 | 5/2018 | Tsou | |
| 2018/0253866 A1 | 9/2018 | Jain et al. | |
| 2018/0276864 A1 | 9/2018 | Hayashi | |
| 2018/0285696 A1* | 10/2018 | Eigen | G06K 9/66 |
| 2018/0307942 A1* | 10/2018 | Pereira | G06K 9/6267 |
| 2018/0349527 A1* | 12/2018 | Li | G05B 19/41885 |
| 2018/0349735 A1 | 12/2018 | Lin et al. | |
| 2019/0080456 A1* | 3/2019 | Song | G06T 7/12 |
| 2019/0156202 A1* | 5/2019 | Falk | G06N 3/0454 |
| 2019/0163804 A1 | 5/2019 | Linton et al. | |
| 2019/0197466 A1* | 6/2019 | Hand, III | G06K 9/00624 |
| 2019/0208412 A1 | 7/2019 | Lord et al. | |
| 2019/0245754 A1 | 8/2019 | Greene, Jr. | |
| 2019/0257767 A1* | 8/2019 | Shaubi | G06T 7/174 |
| 2019/0297042 A1 | 9/2019 | Prabhu | |
| 2019/0325183 A1* | 10/2019 | Tscherepanow | G06N 3/08 |
| 2019/0356956 A1 | 11/2019 | Sheng et al. | |
| 2020/0005046 A1 | 1/2020 | Attorre et al. | |
| 2020/0092607 A1 | 3/2020 | Rechner et al. | |
| 2020/0097724 A1* | 3/2020 | Chakravarty | G06K 9/00664 |
| 2020/0099783 A1 | 3/2020 | Liu et al. | |
| 2020/0125639 A1 | 4/2020 | Doyle | |
| 2020/0125928 A1 | 4/2020 | Doyle | |
| 2020/0126533 A1 | 4/2020 | Doyle et al. | |
| 2020/0154078 A1 | 5/2020 | Ahn et al. | |
| 2020/0160612 A1* | 5/2020 | Bowen | G06Q 30/00 |
| 2020/0162412 A1 | 5/2020 | Mei et al. | |

FOREIGN PATENT DOCUMENTS

| | | |
|---|---|---|
| WO | 2017020515 | 2/2017 |
| WO | 2017214970 | 12/2017 |

OTHER PUBLICATIONS

Simonyan et al., "Very Deep Convolutional Networks for Large-Scale Image Recognition," Proceedings of ICLR, 2015, arXiv:1409.1556v6 [cs.CV], https://arxiv.org/pdf/1409.1556.pdf, 2015.

Mu et al., "Fast and Exact Nearest Neighbor Search in Hamming Space on Full-Text Search Engines," Proceedings of SISAP, 2019, arXiv:1902.08498v2 [cs.IR], https://arxiv.org/abs/1902.08498, 2019.

Neurohive, "VGG16—Convolutional Network for Classification and Detection," https://neurohive.io/en/popular-networks/vgg16/, accessed Apr. 27, 2020.

Van Durme et al., "Online Generation of Locality Sensitive Hash Signatures," http://www.cs.jhu.edu/~vandurme/papers/VanDurmeLal-1ACL10-slides.pdf, accessed Apr. 27, 2020.

* cited by examiner

700

710– Receiving a first set of images including the non-compliant content

720– Receiving a second set of compliant images

730– Converting the first set of images to be transparent

740– Executing a transformation algorithm that is configured to generate synthetic training images by applying one or more random transformations on the first set of images including the non-compliant content and appending the non-compliant content to the compliant images

750– Storing the synthetic training images in a training dataset that can be used to train a neural network detection model

FIG. 7

SYSTEMS, METHODS, AND TECHNIQUES FOR TRAINING NEURAL NETWORKS AND UTILIZING THE NEURAL NETWORKS TO DETECT NON-COMPLIANT CONTENT

TECHNICAL FIELD

This disclosure relates generally to systems, methods, and techniques for training neural networks to detect non-compliant content in images.

BACKGROUND

Training a neural network to detect or identify various categories of content in the images can be difficult due to various technical challenges. For example, one technical challenge relates to overcoming the lack of training images that are available to facilitate the training on certain categories of content. Even if an appropriate set of customized training images could be obtained, the training images would not include appropriate annotations (e.g., bounding boxes or anchor boxes) to assist with training the neural network. Because such annotations are typically performed manually, enormous amounts of time may be required to apply the annotations to large collections of training images (e.g., such as when the collections include thousands, millions or hundreds of millions of images). In many cases, applying the annotations is not possible due to the large number of images.

BRIEF DESCRIPTION OF THE DRAWINGS

To facilitate further description of the embodiments, the following drawings are provided in which:

FIG. 7 is a flowchart for a method, according to certain embodiments.

Figure 1:
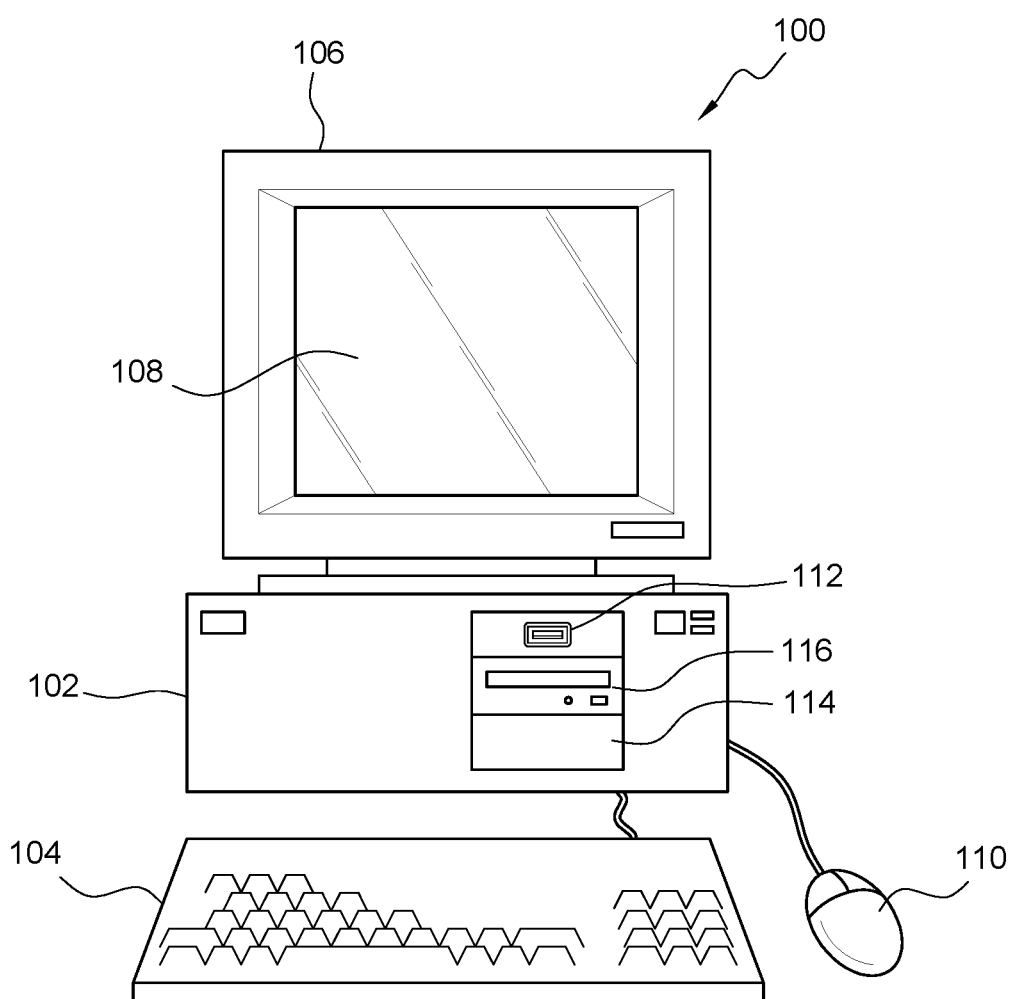
FIG. 1 illustrates a front elevational view of a computer system that is suitable for implementing various embodiments of the systems and methods disclosed in FIGS. 3 and 5-7.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated, relative to other elements, to help improve understanding of embodiments of the present disclosure. The same reference numerals in different figures denote the same elements.

The terms "first," "second," "third," "fourth" and the like in the description and in the claims, if any, are used for distinguishing between similar elements; and are not necessarily for describing a particular sequential or chronological order. It is to be understood that the terms so used are interchangeable under appropriate circumstances; such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under" and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling" and the like should be broadly understood and refer to connecting two or more elements mechanically and/or otherwise. Two or more electrical elements may be electrically coupled together, but not be mechanically or otherwise coupled together. Coupling may be for any length of time, e.g., permanent, semi-permanent or only for an instant. "Electrical coupling" and the like should be broadly understood and include electrical coupling of all types. The absence of the word "removably," "removable" and the like near the word "coupled," and the like does not mean that the coupling, etc. in question is or is not removable.

As defined herein; two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time and less of a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processing modules and one or more non-transitory storage modules computing instructions configured to run on the one or more processing modules. The one or more storage modules can be configured to run on the one or more processing modules and perform acts of: generating a training dataset for training a neural network detection model to identify non-compliant content in images, wherein generating the training dataset comprises: (i) receiving a first set of images including the non-compliant content; (ii) receiving a second set of compliant images; and (iii) executing a transformation algorithm that is configured to generate synthetic training images by applying one or more random transformations on the first set of images including the non-compliant content and appending the non-compliant content to the second set of compliant images; executing a training procedure that utilizes the synthetic training images to train the neural network detection model to identify the non-compliant content; receiving, at the neural network detection model, at least one image; and utilizing the neural network detection model to determine whether the at least one image includes the non-compliant content.

Various embodiments include a method. The method can include: generating a training dataset for training a neural network detection model to identify non-compliant content in images, wherein generating the training dataset comprises: (i) receiving a first set of images including the non-compliant content; (ii) receiving a second set of compliant images; and (iii) executing a transformation algorithm that is configured to generate synthetic training images by applying one or more random transformations on the first set of images including the non-compliant content and appending the non-compliant content to the second set of compliant images; executing a training procedure that utilizes the synthetic training images to train the neural network detection model to identify the non-compliant content; receiving, at the neural network detection model, at least one image; and utilizing the neural network detection model to determine whether the at least one image includes the non-compliant content.

A number of embodiments can a computer program product. The computer program product comprises a non-transitory computer-readable medium including instructions for causing a computer to: generate a training dataset for training a neural network detection model to identify non-compliant content in images, wherein generating the training dataset comprises: (i) receiving a first set of images including the non-compliant content; (ii) receiving a second set of compliant images; and (iii) executing a transformation algorithm that is configured to generate synthetic training images by applying one or more random transformations on the first set of images including the non-compliant content and appending the non-compliant content to the second set of compliant images; execute a training procedure that utilizes the synthetic training images to train the neural network detection model to identify the non-compliant content; receive, at the neural network detection model, at least one image; and utilize the neural network detection model to determine whether the at least one image includes the non-compliant content.

Figure 2:
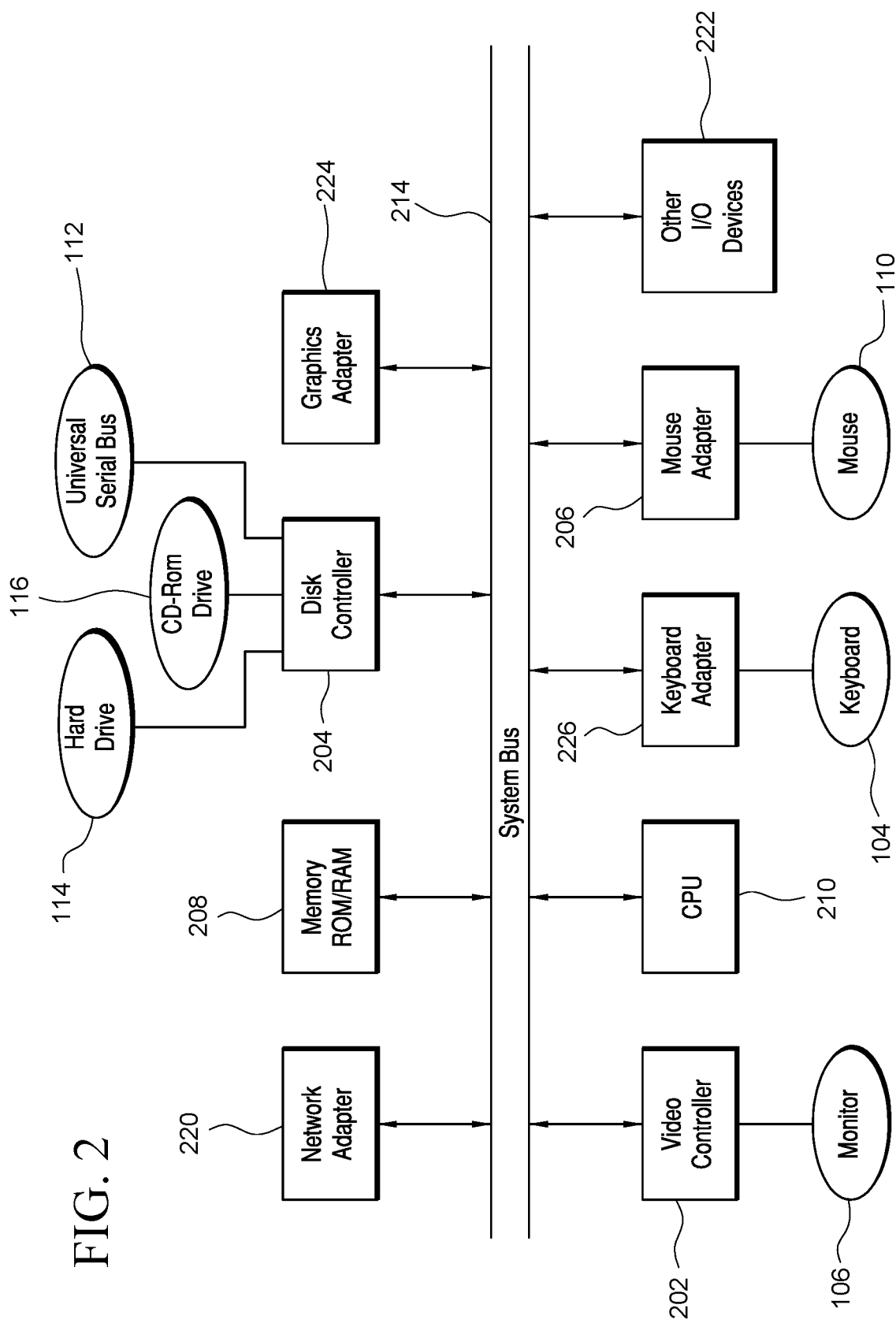
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 208 can comprise (i) non-transitory memory and/or (ii) transitory memory.

In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 can comprise a portable computer, such as a laptop computer. In certain other embodiments, computer system 100 can comprise a mobile electronic device, such as a smartphone. In certain additional embodiments, computer system 100 can comprise an embedded system.

Figure 3:
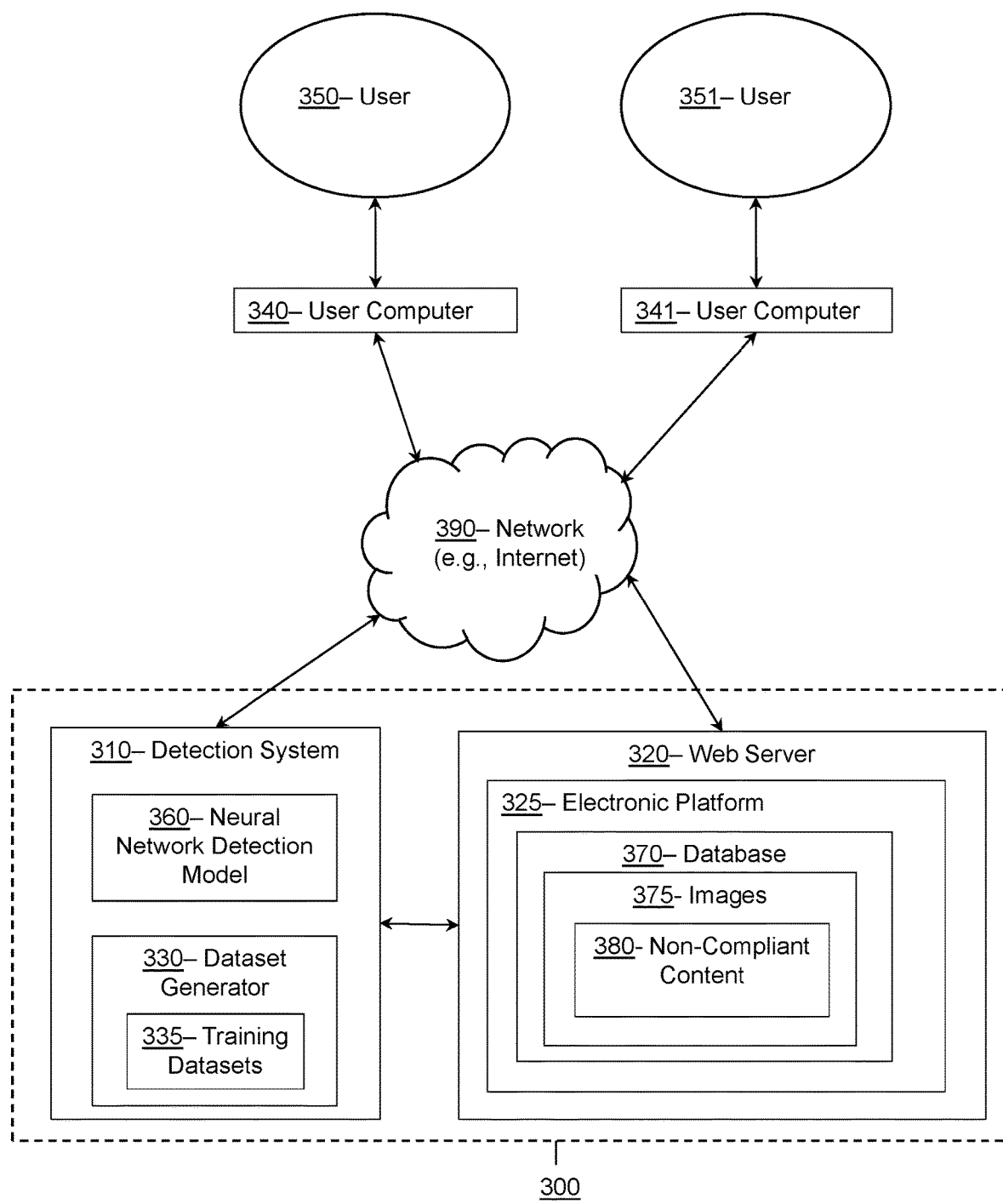
FIG. 3 illustrates a representative block diagram of a system, according to an embodiment.

Turning ahead in the drawings, FIG. 3 illustrates a block diagram of a system 300 that can be employed for detecting non-compliant objects 380 in images 375, as described in greater detail below. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include a detection system 310, a web server 320, and an electronic platform 325. The detection system 310, the web server 320, and the electronic platform 325 can each be a computer system, such as computer system 100 (FIG. 1), as described above, and can each be a single computer, a single server, or a cluster or collection of computers or servers, or a cloud of computers or servers. In another embodiment, a single computer system can host each of two or more of the detection system 310, the web server 320, and the electronic platform 325. Additional details regarding the detection system 310, the web server 320, and the electronic platform 325 are described herein.

In many embodiments, system 300 also can comprise user computers 340, 341. User computers 340, 341 can comprise any of the elements described in relation to computer system 100 (FIG. 1). In some embodiments, user computers 340, 341 can be mobile devices. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR1200™ product, the Vuzix Smart Glasses M100™ product, or a similar product by Vuzix Corporation of Rochester, N.Y., United States of America. In other specific examples, a head mountable wearable user computer device can comprise the Virtual Retinal Display™ product, or similar product by the University of Washington of Seattle, Wash., United States of America. Meanwhile, in further specific examples, a limb mountable wearable user computer device can comprise the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In some embodiments, web server 320 can be in data communication through network 390 (e.g., such as the Internet) with user computers (e.g., 340, 341). The network 390 can represent any type of communication network, e.g., such as one that comprises a local area network (e.g., a Wi-Fi network), a personal area network (e.g., a Bluetooth network), a wide area network, an intranet, the Internet, a cellular network, a television network, and/or other types of networks. In certain embodiments, user computers 340-341 can be desktop computers, laptop computers, smart phones, tablet devices, and/or other endpoint devices. Web server 320 can host one or more websites. For example, web server 320 can host an eCommerce website that allows users to browse and/or search for products, to add products to an electronic shopping cart, and/or to purchase products, in addition to other suitable activities.

In many embodiments, the detection system 310, the web server 320, and the electronic platform 325 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) of the detection system 310, the web server 320, and the electronic platform 325 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of the detection system 310, the web server 320, and the electronic platform 325. In a similar manner, the processing module(s) and the memory storage module(s) can be local and/or remote to each other.

In many embodiments, the detection system 310, the web server 320, and the electronic platform 325 can be configured to communicate with one or more user computers 340 and 341. In some embodiments, user computers 340 and 341 also can be referred to as customer computers. In some embodiments, the detection system 310, the web server 320, and the electronic platform 325 can communicate or interface (e.g., interact) with one or more customer computers (such as user computers 340 and 341) through a network 390 (e.g., the Internet). Network 390 can be an intranet that is not open to the public. Accordingly, in many embodiments, the detection system 310, the web server 320, and the electronic platform 325 (and/or the software used by such systems) can refer to a back end of system 300 operated by an operator and/or administrator of system 300, and user computers 340 and 341 (and/or the software used by such systems) can refer to a front end of system 300 used by one or more users 350 and 351, respectively. In some embodiments, users 350 and 351 also can be referred to as customers, in which case, user computers 340 and 341 can be referred to as customer computers. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, the detection system 310, the web server 320, and the electronic platform 325 also can be configured to communicate with one or more databases (e.g., database 370). The one or more databases can comprise a product database that contains information about products, items, or SKUs (stock keeping units) sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between the detection system 310, the web server 320, the electronic platform 325, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc. Exemplary LAN and/or WAN protocol(s) can comprise: Institute of Electrical and Electronic Engineers (IEEE) 802.3 (also known as Ethernet), IEEE 802.11 (also known as WiFi), etc. Exemplary wireless cellular network protocol(s) can comprise: Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

In certain embodiments, the electronic platform 325 is configured to provide a website for an online retailer or online shopping site that enables users 350, 351 to browse offerings (e.g., products and/or services), place orders, make purchases, access online accounts, and perform other related activities over the network 390. The electronic platform 325 includes a database 370 that stores information associated with the products and/or services, as well as images 375 corresponding to the products and/or services. When users 350, 351 access the website hosted by the electronic platform 325, the electronic platform 325 can display products and/or services, as well as images 375 associated with the products and/or services.

Detection system 310 can be configured to perform functions associated with detecting images 375 that include non-compliant content 380, as well as executing corrective measures for managing or handling images that include non-compliant content 380. In certain embodiments, the non-compliant content 380 can include logos, badges, seller representations, country identification, and/or marketing information that are determined to be inappropriate for display to users 350, 351 and/or inappropriate for display on the electronic platform 325.

For example, in certain embodiments, the non-compliant content 380 in the images 375 can include: logos or other content identifying brands or companies (e.g., logos associated with one or more competitors of an entity that provides the electronic platform 325); marketing badges or other data including representations as to the quality of products or services (e.g., including designations such as "Design Excellence," "Award Winner," "Quality Assurance," "Seal of Excellence," "Risk Free," "Seal of Excellence," "Professionally-Recommended," "5 Year Warranty," and/or other similar designations); marketing badges or other data including representations as to the pricing of products and/or services (e.g., including designations such as "Best-Price Guarantee," "Lowest Price," and/or other similar designations); marketing badges or other data identifying alleged origins or sources of products and/or services (e.g., including designations such as "Made in the USA," "Manufactured in America," and/or other similar designations); and/or other types of content. Detecting and removing images that include the exemplary non-compliant content 380 mentioned above can be beneficial because such content can be harmful to the brand value of the electronic platform 325, and can include misrepresentations that are harmful to customers (e.g., such as badges falsely indicating product quality, manufacturing source, or price guarantees).

The categories of content determined to be non-compliant can be customized based on determinations made by individuals or entities associated with administering, hosting, and/or providing the electronic platform 325. The types of non-compliant content 380 can vary greatly, and can generally include any content that an individual or entity desires to remove from a collection of images 375. In certain embodiments, this can include any content that an individual or entity desires to remove from can the electronic platform 325 and/or restrict access to on the electronic platform 325.

The detection system 310 can store and execute various functions for detecting non-compliant content 380 in the images 375. In certain embodiments, the detection system 310 comprises a neural network detection model 360 that is trained to detect the non-compliant content 380 in the images 375. Generally speaking, the neural network detection model 360 can include any type of neural network architecture and/or machine learning architecture to detect non-compliant content 380 in the images 375. The configuration of the neural network detection model 360 can vary.

In certain embodiments, the neural network detection model 360 can comprise one or more neural networks that are trained to detect non-compliant content 380 in the images 375. The neural networks can be implemented as convolutional neural networks (CNNs) in certain embodiments. Each neural network can be configured to analyze images 375 and to execute deep learning functions and/or machine learning functions on the images 375. Each neural network can include a plurality of layers including, but not limited to, one or more input layers, one or more output layers, one or more convolutional layers (e.g., that include learnable filters), one or more ReLU (rectifier linear unit) layers, one or more pooling layers, one or more fully connected layers, one or more detection layers, one or more upsampling layers, one or more normalization layers, etc. The configurations of the neural networks, and their corresponding layers, enable the neural networks to learn and execute various functions for analyzing, interpreting and understanding the content of the images 375. The functions learned by the neural networks, or other neural network structures, can include computer vision functions that involve object detection, object classification and/or image classification. The functions learned by the neural network detection model 360 can be utilized to determine whether the images 375 include non-compliant content 380 associated with particular categories (e.g., competitor logos, market badges, etc.). Appropriate loss functions can be tailored to optimize the neural networks during training.

In certain embodiments, the neural network detection model 360 can include an object detection model that is trained to identify non-complaint content 380 in the images 375. The neural network detection model 360 alternatively, or additionally, can include a classification model that is trained to identify non-compliant content 380 in the images 375. Exemplary object detection models that can be utilized by the neural network detection model 360 to analyze the images 375 and detect the non-compliant content 380 can be based on, or include, one or more of the following: R-CNN, Faster R-CNN, R-FCN, SSD, FPN, RetinaNet, Yolo (any version including versions 1, 2 3 and/or Yolo9000), etc. Exemplary classification models that can be utilized by the neural network detection model 360 to analyze the images 375 and detect the non-compliant content 380 can be based on, or include, one or more of the following: ResNet, Inception ResNet (any version including versions 1, 2, 3, and 4), VGG-16, VGG0-19, etc. Appropriate modifications can be made to any pre-trained object detection models and/or classification models to identify the specific categories of content determine to be non-complaint content 380.

The task of training the neural network detection model 360 to detect or identify various categories of non-complaint content 380 in the images 375 can be difficult due to various technical challenges. One technical challenge relates to overcoming the lack of training images that are available to facilitate the training of the neural network detection model 360. While many publically available databases can training mages annotated with training information (e.g., the ImageNet database), these databases often do not include the appropriate content to train neural networks to handle granular or customized problems (e.g., such as identifying specific competitor logos, marketing badges, etc.). Moreover, manually attempting to identify a sufficient number of training images often is not possible due to the large number of images (e.g., which, in some cases, can be in the hundreds of thousands or millions) that can be necessary to adequately train the neural network detection model 360 with sufficient precision.

Even if an appropriate set of customized training images were somehow able to be obtained (e.g., by manually conducting searches), the training images would not include appropriate annotations (e.g., bounding boxes, anchor boxes and/or other types of annotations) to assist with training the neural network. Because such annotations are typically performed manually by individuals constructing the neural network, enormous amounts of time can be required to apply the annotations to large collections of training images. In many cases, applying the annotations is not possible due to the large number of images.

To overcome the technical challenges mentioned above, certain embodiments of the detection system 310 can include a dataset generator 330 that is configured to perform functions associated generating one or more training datasets 335 that can be utilized to train the neural network detection model 360 to identify non-compliant content 380 (and/or other content). The dataset generator 330 is capable of generating customized training datasets 335 that can be utilized to train the neural network detection model 360 to identify specific categories of image content (e.g., competitor logos, marketing badges, etc.).

In certain embodiments, the dataset generator 330 is configured to generate a collection of synthetic training images to be included in a training dataset 335 that is utilized to train the neural network detection model 360. To assist with generating the set of synthetic training images, the dataset generator 330 can receive a first set of images that include the non-compliant content 380 sought to be identified. The first set of images can include a relatively small collection of images (e.g., 10 or 50 images) for each category of non-compliant content 380. The images received for each category can include various styles or designs of non-compliant content 380 associated with the category.

Figure 5:
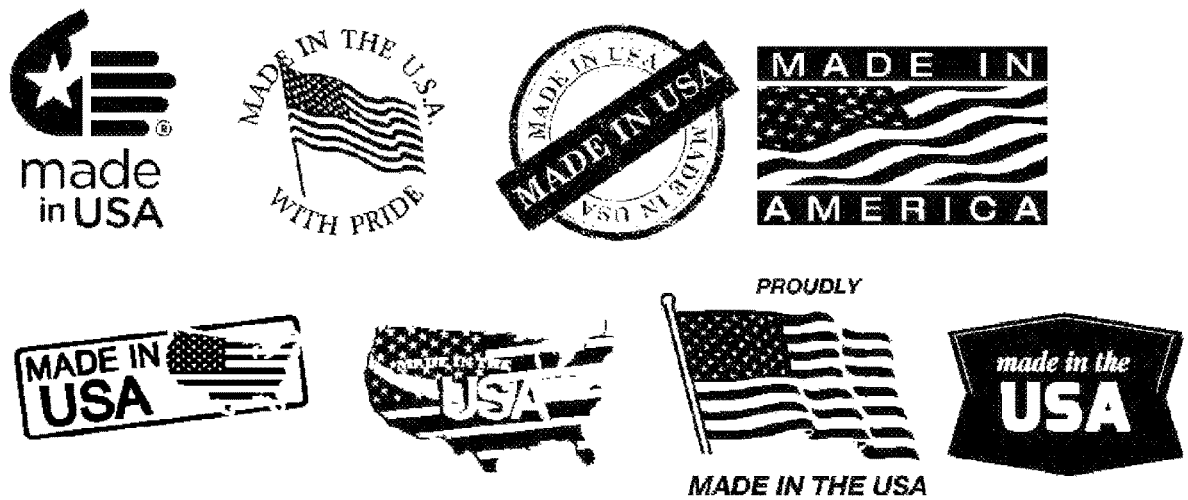
FIG. 5 illustrates exemplary images including non-compliant content, according to an embodiment.

Turning ahead in the figures, FIG. 5 shows eight exemplary images that include non-compliant content 380 corresponding to a "Made in the USA" badge category. These images can be provided to the dataset generator to assist the dataset generator with identifying images that include these badges and other similar badges. The dataset generator can similarly receive small collections of images corresponding to other categories of non-compliant content (e.g., competitor logos, best-seller badges, lowest-price badges, etc.)

Returning to FIG. 3, in addition to receiving images identifying the non-compliant content, the dataset generator 330 can also receive a second set of images that include compliant images, which do not include non-compliant content 380. In many cases, a large collection of compliant images (e.g., 100,000 compliant images) can easily be obtained from database 370 that stores images associated with providing a product and/or service catalog via the electronic platform 325. A large collection of diverse training images can be synthetically generated by performing various transformations on the non-compliant content 380 included in the first set of images, and combining the non-compliant content 380 with the compliant images in various ways.

For example, in certain embodiments, the dataset generator 330 can initially convert the images identifying the non-compliant content 380 into transparent images to permit the non-compliant content 380 to be superimposed onto the compliant images. Before the non-compliant content 380 is superimposed onto the compliant images, a transformation algorithm can be configured to perform random transformations on the non-compliant content 380. For example, in certain embodiments, the transformation algorithm can be configured to perform one or more of the following transformations on each of the transparent images including the non-compliant content 380: random scaling (e.g., randomly increasing or decreasing the size of the non-compliant content 380 and/or images including the non-compliant content 380); random rotation (e.g., randomly rotating, flipping, and/or adjusting the orientation of the non-compliant content 380 and/or images including the non-compliant content 380); random mangling (e.g., randomly distorting the non-compliant content 380 and/or images including the non-compliant content 380); and/or random translation (e.g., randomly selecting locations for placing the non-compliant content 380 or associated images on the compliant images). Other types of transformations can also be applied to the non-compliant content 380, or corresponding images including the non-compliant content 380.

To illustrate by way of example, consider a scenario in which a provider of the electronic platform 325 desires to detect and remove images 375 that include non-compliant content 380 comprising various types of competitor logos and marketing badges. A small sample of images (e.g., 10, 25 or 50 images) corresponding to each category of non-compliant content 380 can be complied, and these images can be converted to transparent images to enable the logos and marketing badges to be superimposed onto a set of compliant images (e.g., which can correspond to products and/or services offered through the electronic platform 325). Before the logos and marketing badges are appended to the compliant images, a transformation algorithm randomly applies transformations on the logos and marketing badges. For example, each logo or marketing badge can be applied to multiple compliant images (e.g., dozens, hundreds, or thousands of compliant images) after being randomly transformed using the transformation algorithm. This process enables the generation of a large and diverse training dataset 335 that can be used to train the neural network detection model 360 to identify images 375 that include the logos and marketing badges.

Using the above techniques, a large training dataset 335 can be generated that includes a diverse set of synthetic training images. The diversity in the dataset can be attributed to both the wide ranging content associated with the compliant images (e.g., which can include content corresponding to various products and/or services), and the random transformations that are performed. The diversity of synthetic training images can be beneficial for training the neural network detection model 360 to identify varying instances of non-compliant content 380 across multiple categories.

In addition, the above techniques avoid the need for applying user-intensive annotations to the training images included in the training dataset 335. Rather, the annotation information can be automatically generated and stored by the detection system 310 during the process of combining the non-compliant content 380. For example, during the process of combining the non-compliant content 380 with the compliant images, the detection system 310 can store information indicating the locations where the non-compliant content 380 was appended to the compliant images, the categories or classes of the objects (which can correspond to the specific logos and badges) that were appended to each of the images, the types of transformations that were applied to the non-compliant content 380, and/or any other relevant information. Any or all of the annotation information can be stored by the detection system 310 and utilized to train the neural network detection model 360.

Further details regarding the techniques for generating the training datasets 335 and utilizing the training datasets to train the neural network detection model 360 are discussed in further detail below.

In response to detecting non-compliant content 380 in a first one of images 375, the detection system 310 can execute one or more corrective actions. In certain embodiments, these corrective actions can include removing or deleting the first one of images 375 with non-compliant content 380 from a database (e.g., such as database 370) and/or the electronic platform 325. The corrective actions can additionally, or alternatively, include preventing the first one of images 375 from being accessible on the electronic platform, flagging the first one of images 375 for human review, and/or editing the first one of images 375 (e.g., to remove the non-compliant content 380 or to block the non-compliant content 380) and allowing the edited version of the first one of images 375 to be accessible to the electronic platform 325.

As evidenced by the disclosure herein, the techniques set forth in this disclosure are rooted in computer technologies that overcome existing problems in known computer vision systems, specifically problems dealing with generating training datasets 335 and utilizing the training datasets 335 to configure neural networks. The techniques described in this disclosure provide a technical solution (e.g., one that utilizes various artificial intelligence-based neural networking and machine learning techniques) for overcoming these obstacles. For example, the dataset generation techniques described herein take advantage of data transformation techniques to generate synthetic training images that enable neural networks to learn functions for identifying images with non-compliant content 380. Moreover, in certain embodiments, the data generation techniques avoid the obstacles associated with applying user-intensive annotations to the training dataset by automatically generating annotation information while the synthetic training images are generated. This technology-based solution marks an improvement over existing capabilities and functionalities related to computer vision systems by improving the techniques for training neural networks and reducing the time required to do so.

Figure 4:
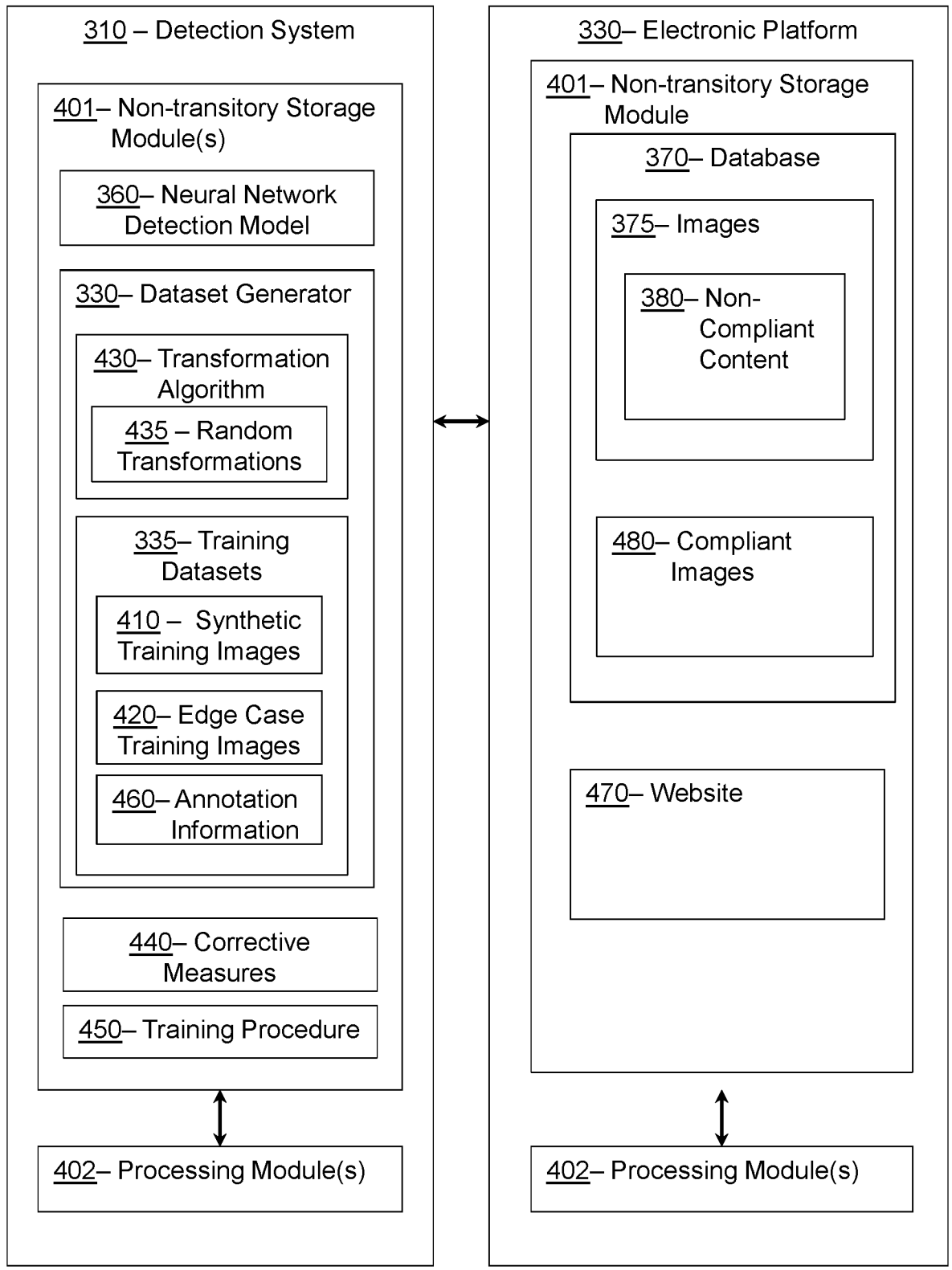
FIG. 4 illustrates a representative block diagram of a portion of the system of FIG. 3, according to an embodiment.

FIG. 4 illustrates a block diagram of a portion of system 300 comprising a detection system 310 and an electronic platform 325 according to the embodiment shown in FIG. 3. Each of the detection system 310 and the electronic platform 325 is merely exemplary, and not limited to the embodiments presented herein. Each of the detection system 310 and the electronic platform 325 can be employed in many different embodiments or examples not specifically depicted or described herein. In some embodiments, certain elements or modules of the detection system 310 and the electronic platform 325 can perform various procedures, processes, and/or acts. In other embodiments, the procedures, processes, and/or acts can be performed by other suitable elements or modules. In many embodiments, the detection system 310 and the electronic platform 325 can each comprise one or more non-transitory memory storage modules 401. In many embodiments, the detection system 310 and the electronic platform 325 can each store computing instructions on the one or more non-transitory memory storage modules 401 and the instructions can be configured to run on one or more processing modules 402 and to perform the functions discussed herein.

Generally, therefore, the system can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system described herein.

As mentioned above, the neural network detection model 360 can include a neural network (e.g., a CNN) that is configured and trained to identify non-complaint content 380 in the images 375 across a plurality of categories. For example, in certain embodiments, the neural network detection model 360 can be configured to identify company logos and marketing badges (e.g., best-seller badges, manufacturing source badges, product quality badges, pricing badges, etc.). The neural network detection model 360 can utilize any type of object detection model (e.g., R-CNN, Faster R-CNN, R-FCN, SSD, FPN, RetinaNet, Yolo, etc.) and/or any type of classification model (e.g., ResNet, Inception ResNet, VGG-16, VGG0-19, etc.) to analyze the images 375 and detect the non-compliant content 380 in the images 375.

The dataset generator 330 can be configured to perform any or all functions associated with generating a training dataset 335 that can be utilized to train the neural network detection model 360. The training datasets 335 can include synthetic training images 410 that are generated by combining a first set of images that comprises non-compliant content 380 with a second set of compliant images 480 that do not comprise non-compliant content 380. For example, the synthetic training images 410 can be generated, at least in part, by superimposing the non-compliant content 380 onto the compliant images 480.

In certain embodiments, the dataset generator 330 includes a transformation algorithm 430 that is configured to apply one or more random transformations 435 to the non-compliant content 380 that is being appended to, or superimposed on, the compliant images 480. Generally speaking, the random transformations 435 can vary greatly. In certain embodiments, the random transformations 435 can include randomly scaling, rotating, orienting, flipping, translating, mangling, and/or distorting the non-compliant content 380. Each instance of the non-compliant content 380 included in the first set of images can be applied to a plurality of compliant images 480 after the transformation algorithm 430 applies one or more random transformations on the non-compliant content 380 and/or associated image including the non-compliant content 380.

A large collection of synthetic training images 410 (e.g., 100,000 images) can be generated for each category of non-compliant content. For example, the dataset generator 330 can generate 100,000 synthetic training images 410 for a first competitor logo, 100,000 synthetic training images 410 for a second competitor logo, 100,000 synthetic training images 410 for a best seller badge, 100,000 synthetic training images 410 for a "Made in the USA" badge, etc.

During the generation of the training images 410, the dataset generator 330 can generate and store annotation data 460 for each of the images. The annotation information 460 can include any data that is appended to, or associated with, the training images 410 that can assist with training the neural network detection model 360. In certain embodiments, the annotation information 460 for a first one of training images 410 can include information that identifies the location where the non-compliant content 380 is located in the first one of training images 410. The locations can be identified by using bounding boxes, anchor boxes, image coordinates, and/or any other data that is able to identify the location of the non-compliant content 380. In certain embodiments, the annotation data 460 for a training image 410 can include information that identifies the types of transformations that were applied to the non-compliant content 380 by the transformation algorithm 430 and the type of non-compliant content 380 that was inserted into the training image 410 (e.g., indicating a particular category of logos or badges). Any or all of the annotation information can be stored by the detection system 310 and utilized to train the neural network detection model 360.

Generally speaking, any type of training procedure 450 can be utilized to train the neural network detection model 360. The particular training procedure applied to train the neural network detection model 360 can vary according to different embodiments. In certain embodiments, the training images 410 utilized to train the neural network detection model 360 include both images with non-compliant content 380 and compliant images 480, and the training procedure 450 teaches the neural network detection model 360 to differentiate between the two.

In certain embodiments, the training procedure 450 can include an active learning training procedure. In certain embodiments, this procedure can involve interactively querying an individual and/or information source to obtain the desired outputs during training.

In certain embodiments, a first batch of training images 410 (e.g., in the range of half a million images) are utilized to train the neural network detection model 360 in a first training cycle. The neural network detection model 360 can output scores for each image indicating likelihoods that the image includes one or more categories of non-compliant content 380. Training images 410 that are assigned scores within certain threshold ranges can be checked for accuracy by an individual assisting with training the neural network detection model 360 to determine whether the neural network detection model 360 is accurately identifying non-compliant content 380 (e.g., whether the neural network detection model 360 is generating true positives or false positives on those training images 410). This information can then be stored with the annotation information 460 and used to further fine-tune the neural network detection model 360. Several successive active learning cycles can produce a neural network detection model 360 that has both high precision and recall.

In certain embodiments, a set of edge case training images 420 can be used during the training procedure 450 to further hone the accuracy of the neural network detection model 360. The edge case training images 420 can relate to images that include content that is similar to non-compliant content 380, but which does not include non-compliant content 380. In certain embodiments, the edge case training images 420 can include logos or badges that are acceptable and compliant, but which are similar to certain logos or badges that correspond to non-compliant content 380. For example, while an image of an American flag indicating that a product was manufactured in the United States can represent non-compliant content, an image of an British or Chinese flag can be compliant. Thus, the edge case training images 420 can assist with training the neural network detection model 360 to differentiate between such close calls.

In certain embodiments, the transformation algorithm 430 is used to combine the edge case training images 420 with compliant images 480 in the same manner as discussed above. For example, after the edge case training images 420 are converted to transparent images, the transformation algorithm 430 can apply one or more random transformations 435 to each of the edge case training images 420, and each of the edge case training images 420 can be superimposed on a compliant image 380. These synthetic images can be included in the batch of compliant images that are utilized to train the neural network detection model 360.

In certain embodiments, the techniques discussed herein for detecting non-compliant content 380 in images 375 and/or executing corrective measures 440 to handle images with non-compliant content 380 can be executed to control the display of images 375 on a website 470 that is provided by the electronic platform 325. The website 470 can represent an online shopping site and/or a website that is provided in connection with an online retailer. The techniques for detecting non-compliant content 380 in images 375 and/or executing corrective measures 440 can be performed as a pre-processing step (e.g., before such images 375 become publically accessible on the website 470) and/or can be performed in real time as images 375 are provided to the electronic platform 325 (e.g., as images 375 are uploaded to the electronic platform by sellers, third parties, and/or website administrators). Executing these techniques can be beneficial because displaying the images 375 with non-compliant content 380 can have negative impacts on businesses that operate the electronic platforms 325 by harming the brand value of the businesses and/or by providing customers with false or misleading marketing badges.

The detection system 310 can store instructions for executing one or more corrective actions 440 to handle images 375 that include non-compliant content 380. The corrective actions 440 can include functions for preventing the images 375 from being published on the electronic platform 325 and/or limiting access to the images 375. For example, in response to detecting non-compliant content 380 in a first one of images 375, the detection system 310 can execute one or more of the following corrective actions: removing or deleting the first one of images 375; preventing the first one of images 375 from being accessible on the electronic platform 325; flagging the first one of images 375 for human review; editing the first one of images 375 to remove the non-compliant content 380; annotating the first one of images 375 to block the non-compliant content 380; and/or associating the first one of images 375 with a warning message that warns users 350, 351 of the non-compliant content 380. The detection system 310 can execute other types of corrective measures 440 for handling images 375 determined to include non-compliant content 380. For example, the other types of corrective measures 440 can include editing or revising the first one of images 375 to obscure, cover up, or remove the non-compliant content 380 from the first one of images 375, and permit the edited or revised first one of images 375 to be accessed by the electronic platform 330.

Figure 6:
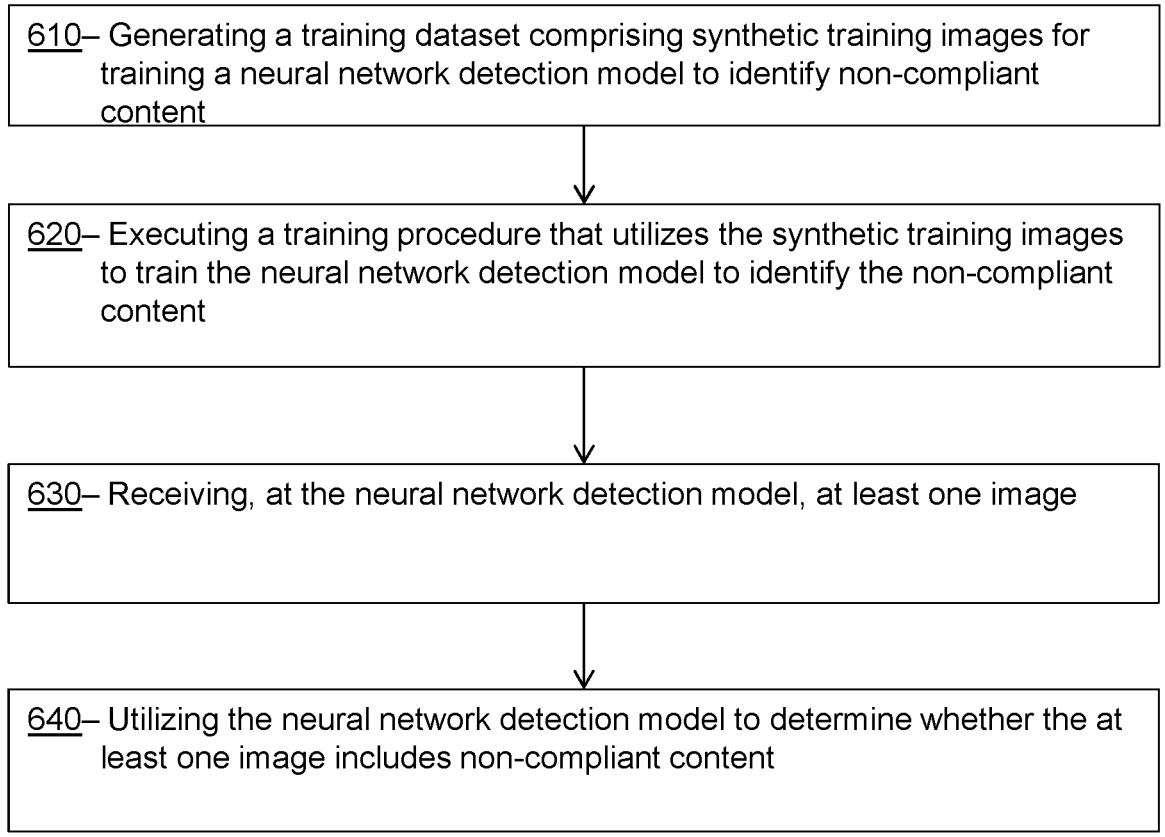
FIG. 6 is a flowchart for a method, according to certain embodiments.

Turning ahead in the drawings, FIG. 6 illustrates a flow chart for a method 600, according to an embodiment. Method 600 can be utilized to train a neural network detection model. Method 600 is merely exemplary and is not limited to the embodiments presented herein. Method 600 can be employed in many different embodiments or examples not specifically depicted or described herein. In some embodiments, the activities of method 600 can be performed in the order presented. In other embodiments, the activities of method 600 can be performed in any suitable order. In still other embodiments, one or more of the activities of method 600 can be combined or skipped. In many embodiments, system 300 (FIG. 3) and/or detection system 310 (FIGS. 3 & 4) can be suitable to perform method 600 and/or one or more of the activities of method 600. In these or other embodiments, one or more of the activities of method 600 can be implemented as one or more computer instructions configured to run at one or more processing modules 402 (FIG. 4) and configured to be stored at one or more non-transitory memory storage modules 401 (FIG. 4). Such non-transitory memory storage modules 401 (FIG. 4) can be part of a computer system such as system 300 (FIG. 3), detection system 310 (FIGS. 3 & 4), and/or electronic platform 325 (FIGS. 3 & 4). The processing module(s) can be similar or identical to the processing module(s) described above with respect to computer system 100 (FIG. 1).

In certain embodiments, method 600 can comprise an activity 610 of generating a training dataset comprising synthetic training images for training a neural network detection model to identify non-compliant content. The method 600 can further comprise an activity 620 of executing a training procedure that utilizes the synthetic training images to train the neural network detection model to identify the non-compliant content. The method 600 can further comprise an activity 630 of receiving, at the neural network detection model, at least one image. The method 600 can further comprise an activity 640 of utilizing the neural network detection model to determine whether the at least one image includes non-compliant content.

FIG. 7 illustrates a flow chart for a method 700, according to an embodiment. Method 700 can be utilized to generate a training dataset for training a neural network detection model. Method 700 is merely exemplary and is not limited to the embodiments presented herein. Method 700 can be employed in many different embodiments or examples not specifically depicted or described herein. In some embodiments, the activities of method 700 can be performed in the order presented. In other embodiments, the activities of method 700 can be performed in any suitable order. In still other embodiments, one or more of the activities of method 700 can be combined or skipped. In many embodiments, system 300 (FIG. 3) and/or detection system 310 (FIGS. 3 & 4) can be suitable to perform method 700 and/or one or more of the activities of method 700. In these or other embodiments, one or more of the activities of method 700 can be implemented as one or more computer instructions configured to run at one or more processing modules 402 (FIG. 4) and configured to be stored at one or more non-transitory memory storage modules 401 (FIG. 4). Such non-transitory memory storage modules 401 (FIG. 4) can be part of a computer system such as system 300 (FIG. 3), detection system 310 (FIGS. 3 & 4), and/or electronic platform 325 (FIGS. 3 & 4). The processing module(s) can be similar or identical to the processing module(s) described above with respect to computer system 100 (FIG. 1).

In certain embodiments, method 700 can comprise an activity 710 of receiving a first set of images including the non-compliant content. The method 700 can further comprise an activity of 720 receiving a second set of compliant images. The method 700 can further comprise an activity of 730 converting the first set of images to be transparent. The method 700 can further comprise an activity of 740 executing a transformation algorithm that is configured to generate synthetic training images by applying one or more random transformations on the first set of images including the non-compliant content and appending the non-compliant content to the compliant images. The method 700 can further comprise an activity of 750 storing the synthetic training images in a training dataset that can be used to train a neural network detection model.

Although systems and methods have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-6 may be modified, and that the foregoing discussion of certain of these embodiments does not necessarily represent a complete description of all possible embodiments. For example, one or more of the procedures, processes, or activities of FIG. 6 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
one or more processors; and
one or more non-transitory computer-readable storage media storing computing instructions configured to run on the one or more processors and perform:
generating a training dataset for training a neural network detection model to identify non-compliant content in images, wherein generating the training dataset comprises:
receiving a first set of images including the non-compliant content;
receiving a second set of compliant images;
executing a transformation algorithm that is configured to generate synthetic training images by (i) applying one or more random transformations on the first set of images including the non-compliant content and (ii) appending the non-compliant content to the second set of compliant images; and
utilizing the transformation algorithm by (i) applying the one or more random transformations on edge case training images and (ii) appending the edge case training images to compliant images included in the second set of compliant images;
executing a training procedure that utilizes the synthetic training images to train the neural network detection model to identify the non-compliant content;
receiving, at the neural network detection model, at least one image; and
utilizing the neural network detection model to determine whether the at least one image includes the non-compliant content.

2. The system of claim 1, wherein applying the one or more random transformations includes one or more of:
randomly scaling the non-compliant content before appending the non-compliant content to the second set of compliant images;
randomly rotating the non-compliant content before appending the non-compliant content to the second set of compliant images;
randomly distorting the non-compliant content before appending the non-compliant content to the second set of compliant images; or
randomly determining where the non-compliant content is to be placed on the second set of compliant images.

3. The system of claim 1, wherein:
the edge case training images include compliant images that resemble one or more categories of the non-compliant content.

4. The system of claim 3, wherein the computing instructions are further configured to run on the one or more processors and perform:
executing one or more corrective measures on the at least one image in response to determining that the at least one image includes non-compliant content, wherein the one or more corrective measures comprise removing the non-compliant content from the at least one image.

5. The system of claim 1, wherein executing the training procedure includes applying active learning to train the neural network detection model.

6. The system of claim 1, wherein:
generating the training dataset includes automatically generating and storing annotation information associated with the synthetic training images; and
the annotation information is utilized to train the neural network detection model during the training procedure.

7. The system of claim 1, wherein the computing instructions are further configured to run on the one or more processors and perform:
executing one or more corrective measures on the at least one image in response to determining that the at least one image includes non-compliant content.

8. The system of claim 7, wherein the one or more corrective measures include at least one of:
   removing the at least one image from a database;
   preventing the at least one image from being published on a website;
   flagging the at least one image for manual review;
   deleting the at least one image;
   removing the non-compliant content from the at least one image; or
   annotating the at least one image to block the non-compliant content.

9. The system of claim 1, wherein generating the training dataset further includes converting the first set of images to transparent images.

10. The system of claim 1, wherein the non-compliant content includes one or more of:
   logos or badges identifying one or more brands;
   logos or badges identifying one or more seller statuses;
   logos or badges including marketing information; or
   logos or badges identifying one or more countries.

11. A method being implemented via execution of computing instructions configured to run at one or more processors and configured to be stored at non-transitory computer-readable media, the method comprising:
   generating a training dataset for training a neural network detection model to identify non-compliant content in images, wherein generating the training dataset comprises:
      receiving a first set of images including the non-compliant content;
      receiving a second set of compliant images;
      executing a transformation algorithm that is configured to generate synthetic training images by (i) applying one or more random transformations on the first set of images including the non-compliant content and (ii) appending the non-compliant content to the second set of compliant images; and
      utilizing the transformation algorithm by (i) applying the one or more random transformations on edge case training images and (ii) appending the edge case training images to compliant images included in the second set of compliant images;
   executing a training procedure that utilizes the synthetic training images to train the neural network detection model to identify the non-compliant content;
   receiving, at the neural network detection model, at least one image; and
   utilizing the neural network detection model to determine whether the at least one image includes the non-compliant content.

12. The method of claim 11, wherein applying the one or more random transformations includes one or more of:
   randomly scaling the non-compliant content before appending the non-compliant content to the second set of compliant images;
   randomly rotating the non-compliant content before appending the non-compliant content to the second set of compliant images;
   randomly distorting the non-compliant content before appending the non-compliant content to the second set of compliant images; or
   randomly determining where the non-compliant content is to be placed on the second set of compliant images.

13. The method of claim 11, wherein:
   the edge case training images include compliant images that resemble one or more categories of the non-compliant content.

14. The method of claim 13, further comprises:
   executing one or more corrective measures on the at least one image in response to determining that the at least one image includes non-compliant content, wherein the one or more corrective measures comprise removing the non-compliant content from the at least one image.

15. The method of claim 11, wherein executing the training procedure includes applying active learning to train the neural network detection model.

16. The method of claim 11, wherein:
   generating the training dataset includes automatically generating and storing annotation information associated with the synthetic training images; and
   the annotation information is utilized to train the neural network detection model during the training procedure.

17. The method of claim 11, further comprises:
   executing one or more corrective measures on the at least one image in response to determining that the at least one image includes non-compliant content.

18. The method of claim 17, wherein the one or more corrective measures include at least one of:
   removing the at least one image from a database;
   preventing the at least one image from being published on a website;
   flagging the at least one image for manual review;
   deleting the at least one image;
   removing the non-compliant content from the at least one image; or
   annotating the at least one image to block the non-compliant content.

19. The method of claim 11, wherein the non-compliant content include one or more of:
   logos or badges identifying one or more brands;
   logos or badges identifying one or more seller statuses;
   logos or badges including marketing information; or
   logos or badges identifying one or more countries.

20. A computer program product comprising a non-transitory computer-readable medium including instructions for causing a computer to:
   generate a training dataset for training a neural network detection model to identify non-compliant content in images, wherein generating the training dataset comprises:
      receiving a first set of images including the non-compliant content;
      receiving a second set of compliant images;
      executing a transformation algorithm that is configured to generate synthetic training images by (i) applying one or more random transformations on the first set of images including the non-compliant content and (ii) appending the non-compliant content to the second set of compliant images; and
      utilizing the transformation algorithm by (i) applying the one or more random transformations on edge case training images and (ii) appending the edge case training images to compliant images included in the second set of compliant images;
   execute a training procedure that utilizes the synthetic training images to train the neural network detection model to identify the non-compliant content;
   receive, at the neural network detection model, at least one image; and
   utilize the neural network detection model to determine whether the at least one image includes the non-compliant content.

* * * * *